United States Patent
Bettecken et al.

(10) Patent No.: US 10,173,479 B2
(45) Date of Patent: Jan. 8, 2019

(54) METHOD AND DEVICE FOR LOCATING WHEELS OF A VEHICLE AS WELL AS A TIRE PRESSURE MONITORING SYSTEM

(71) Applicant: CONTINENTAL AUTOMOTIVE GMBH, Hannover (DE)

(72) Inventors: Juergen Bettecken, Regensburg (DE); Juergen Spotka, Regenstauf (DE)

(73) Assignee: Continental Automotive GmbH, Hannover (DE)

( * ) Notice: Subject to any disclaimer, the term of this patent is extended or adjusted under 35 U.S.C. 154(b) by 139 days.

(21) Appl. No.: 14/898,190

(22) PCT Filed: Jun. 11, 2014

(86) PCT No.: PCT/EP2014/062151
§ 371 (c)(1),
(2) Date: Dec. 14, 2015

(87) PCT Pub. No.: WO2014/198785
PCT Pub. Date: Dec. 18, 2014

(65) Prior Publication Data
US 2016/0129735 A1    May 12, 2016

(30) Foreign Application Priority Data

Jun. 14, 2013  (DE) .................. 10 2013 211 152

(51) Int. Cl.
*B60C 23/02*    (2006.01)
*B60C 23/04*    (2006.01)
(Continued)

(52) U.S. Cl.
CPC .......... *B60C 23/0416* (2013.01); *B60C 19/00* (2013.01); *B60C 23/0489* (2013.01); *B60C 2019/004* (2013.01)

(58) Field of Classification Search
None
See application file for complete search history.

(56) References Cited

U.S. PATENT DOCUMENTS 8,332,103 B2    12/2012 Greer et al.
8,332,104 B2    12/2012 Greer et al.
(Continued)

FOREIGN PATENT DOCUMENTS

CN    102666147 A    9/2012
DE    102009059788 A1    6/2011
(Continued)

*Primary Examiner* — Thomas G Black
*Assistant Examiner* — Demetra R Smith-Stewart
(74) *Attorney, Agent, or Firm* — Laurence A. Greenberg; Werner H. Stemer; Ralph E. Locher (57) ABSTRACT

A method and a device locate wheels of a vehicle, according to which method at least one wheel has wheel electronics. In accordance with the method, a signal is received on the vehicle side by the wheel electronics, which signal allows conclusions to be drawn about a point in time at which the wheel assumed a first rotation angle position. The signal contains a plurality of packets. At least one time interval between the packets is determined, and at least one estimated value for the at least one time interval is provided on the basis of the at least one determined time interval.

10 Claims, 6 Drawing Sheets

(51) Int. Cl.
*G01P 3/44* (2006.01)
*B60C 19/00* (2006.01)

(56) References Cited

U.S. PATENT DOCUMENTS

| | | | |
|---|---|---|---|
| 8,659,411 B2 | 2/2014 | Fink | |
| 9,031,738 B2* | 5/2015 | Juzswik | B60C 23/0416 |
| | | | 701/32.7 |
| 9,278,590 B2 | 3/2016 | Friel et al. | |
| 9,387,733 B2 | 7/2016 | Fink | |
| 9,694,631 B2* | 7/2017 | Tsuchikawa | B60C 23/0435 |
| 2001/0008083 A1* | 7/2001 | Brown | B60C 23/0408 |
| | | | 73/146 |
| 2012/0259507 A1 | 10/2012 | Fink | |
| 2013/0166166 A1* | 6/2013 | Steiner | B60C 23/0416 |
| | | | 701/71 |
| 2014/0088816 A1* | 3/2014 | Shima | B60C 23/0416 |
| | | | 701/29.1 |
| 2014/0150543 A1 | 6/2014 | Shima et al. | |
| 2014/0176324 A1* | 6/2014 | Kim | B60C 23/0416 |
| | | | 340/442 |
| 2014/0207329 A1* | 7/2014 | Juzswik | B60C 23/0416 |
| | | | 701/32.7 |
| 2014/0354421 A1* | 12/2014 | Kosugi | B60C 23/0416 |
| | | | 340/447 |
| 2015/0088369 A1 | 3/2015 | Juzswik | |
| 2016/0166140 A1* | 6/2016 | Lawrenson | A61B 3/0025 |
| | | | 351/208 |

FOREIGN PATENT DOCUMENTS

| | | | | |
|---|---|---|---|---|
| EP | 1227018 A2 * | 7/2002 | | B60C 23/0408 |
| EP | 2711204 A1 | 3/2014 | | |
| JP | 2005069693 A | 3/2005 | | |
| JP | 2006123725 A | 5/2006 | | |
| JP | 2006138803 A | 6/2006 | | |
| JP | 2010122023 A | 6/2010 | | |
| JP | 2011070400 A | 4/2011 | | |
| JP | 2011527971 A | 11/2011 | | |
| JP | 2012236556 A | 12/2012 | | |
| JP | 2012240615 A | 12/2012 | | |
| JP | 2013505167 A | 2/2013 | | |
| JP | 2013514934 A | 5/2013 | | |
| JP | 2014019214 A | 2/2014 | | |
| JP | 2014141247 A | 8/2014 | | |
| JP | 2016533954 A | 11/2016 | | |
| WO | 2010034703 A1 | 4/2010 | | |
| WO | 2011085877 A1 | 7/2011 | | |
| WO | 2012157308 A1 | 11/2012 | | |

* cited by examiner

METHOD AND DEVICE FOR LOCATING WHEELS OF A VEHICLE AS WELL AS A TIRE PRESSURE MONITORING SYSTEM

BACKGROUND OF THE INVENTION

Field of the Invention

The present invention relates to a method and a device for locating wheels of a vehicle in which the at least one wheel has wheel electronics. In addition, the present invention relates to a tire pressure monitoring system having such a device.

Tire pressure monitoring systems that measure directly are known in the prior art and are characterized in that at least one wheel is equipped with directly-measuring wheel electronics. If all of the wheels are equipped with wheel electronics which transmit corresponding data to a vehicle receiver, it is desirable to be able to display to the driver the wheel from which, i.e. the wheel position from which, data have been transmitted. When a pressure loss is detected, this makes it possible to directly communicate to the driver which of the wheels on the vehicle is losing pressure.

In the prior art such as WO 2010/034 703 A1, WO 2011/085 877 A1 and U.S. Pat. No. 8,332,104 B2, methods are known that enable wheel electronics to be located by comparing an angular position of the wheel electronics in comparison to an angular position of the wheels, as can be measured by an ABS or respectively ESP system. Since individual packets which are transmitted by the wheel electronics may not arrive at a vehicle receiver (for example due to shielding by the body), it is for example known from U.S. Pat. No. 8,332,104 B2 to send a plurality of packets a delay. If for example the first packet is lost, the transmission time of the first packet can be calculated retroactively with the assistance of the second packet and a previously known delay. A plurality of identical packets are transmitted in order to be able to compensate, by means of the obtained redundancy, for the loss of individual packets.

BRIEF SUMMARY OF THE INVENTION

On the basis of the prior art, an object of the present invention is to provide a way to locate wheels of a vehicle which possesses greater precision or converges more quickly.

This object is achieved by the subject matter of the independent claims. The dependent claims offer embodiments of the invention.

Accordingly, the invention comprises a method for locating wheels of a vehicle, wherein at least one wheel has wheel electronics, wherein the following steps are executed by the vehicle. First, a signal is received from the wheel electronics which permits conclusions about a time at which the wheel assumed a first rotary angle position. Based on the signal, first rotary angle information is generated. Second rotary angle positions of the wheels are determined by sensors which are each assigned to a specific position in the vehicle. Based on the second rotary angle positions, second bits of rotary angle information are provided. The first rotary angle information is compared with the second bits of rotary angle information. The wheel assigned to the wheel electronics is located depending on this comparison. In this method, the signal consists of a plurality of packets which are received with a delay. The step of generating the first rotary angle information contains the step of determining the time at which the wheel assumed the first rotary angle position based on one of the plurality of packets. Furthermore, the vehicle determines at least one time interval between the packets, and at least one estimated value is provided for the at least one time interval based on the determined at least one time interval.

By determining at least one time interval between the packets and providing at least one estimated value for the at least one time interval based on the determined at least one time interval, imprecisions in the clocks of the wheel electronics can be compensated so that a more precise method for locating wheels of a vehicle results, or respectively the method converges more quickly so that the wheels can be located faster.

In the method, the following steps can be executed by the wheel electronics:

Determination of the first rotary angle position of the wheel assigned to the wheel electronics, and transmission of the signal which permits conclusions about the time at which the wheel assumed the first rotary angle position.

In one embodiment of the method, each packet has a number which indicates the rank assumed by the packet within a sequence of the plurality of packets. If a received signal does not contain a first packet, the step occurs of determining the time at which the wheel assumed the first rotary angle position based on the at least one estimated value for the at least one time interval and the number of a packet.

In this manner with the assistance of the at least one estimated value and the number of a selected packet, the time at which the wheel assumed the first rotary angle position can be retroactively calculated.

The step of determining at least one time interval between the packets can be executed several times, and the determined time intervals can be correspondingly saved.

In one embodiment, the method is executed in a plurality of sequential periods, and only the time intervals of the most recent "n" periods are saved, wherein "n" can in particular be a natural number. This can for example be implemented using a ring buffer. The required memory space is reduced in this manner.

The step of providing at least one estimated value may comprise the step of forming at least one average from the saved time intervals. The saved time intervals in this case are hence averaged in order to thereby generate a more robust estimated value.

In one embodiment, the step of providing at least one estimated value comprises the following steps.

A first product is calculated by multiplying the at least one time interval determined in a current period by a previously determined value which lies between 0 and 1. Before, after or at the same time, a second product can be calculated by multiplying an estimated value of a preceding period by 1 minus the previously determined value. This preceding period can in particular be the period which directly precedes the current period in time. By adding the first and second product, the estimated value of the current period can then be calculated. In this embodiment, the required memory is minimized since the at least one estimated value is only saved for one period.

In one embodiment, the step of determining at least one time interval between the packets is only executed when the received signal comprises all the anticipated packets. This is to prevent incorrect time intervals from being calculated due to the possible lack of a packet.

In addition, the present invention comprises a device for locating wheels of a vehicle in which the, wherein at least one wheel has wheel electronics. The device possesses a first reception unit for receiving a signal from the wheel electronics, wherein the signal permits conclusions about a time at which the wheel assumed a first rotary angle position. A first processing unit serves to generate first rotary angle information based on the signal. A second reception unit of the device serves to receive second rotary angle positions of the wheels measured by sensors which are each assigned to a specific position in the vehicle. In addition, the device comprises a second processing unit for providing second bits of rotary angle information based on the second rotary angle positions. A comparison unit is set up for comparing the first rotary angle information with second bits of rotary angle information. A locating unit serves to locate the wheel assigned to the wheel electronics depending on a result of the comparison unit. The first reception unit is set up to receive a signal consisting of a plurality of packets which are received with a delay. The first processing unit is set up to determine a time at which the wheel assumed the first rotary angle position based on one of the plurality of packets. Furthermore, the device has an interval-determining device for determining at least one time interval between the packets. In addition, the device has an estimating apparatus for providing at least one estimated value for the at least one time interval based on the determined at least one time interval.

Furthermore, the present invention comprises a tire pressure monitoring system with a device according to the invention.

The invention has been described with reference to a method and a device. If not otherwise explicitly indicated, the features of the method are analogously applicable to the device according to the invention. This means in particular that the device has the corresponding means for performing the described method steps. A repetition of these means will be withheld so as to not unnecessarily lengthen the description of the patent. Nonetheless, they should be considered disclosed.

BRIEF DESCRIPTION OF THE SEVERAL VIEWS OF THE DRAWING

Additional advantages and details of embodiments of the present invention will be explained with reference to the figures. In the following.

DESCRIPTION OF THE INVENTION

If not otherwise indicated, equivalent and equivalently-acting elements will be cited with the same reference signs in the following description.

Figure 1A:
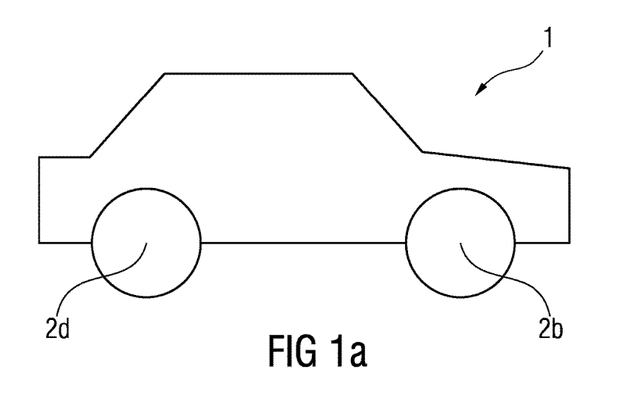
FIG. 1a shows a vehicle from the side.
Figure 1B:
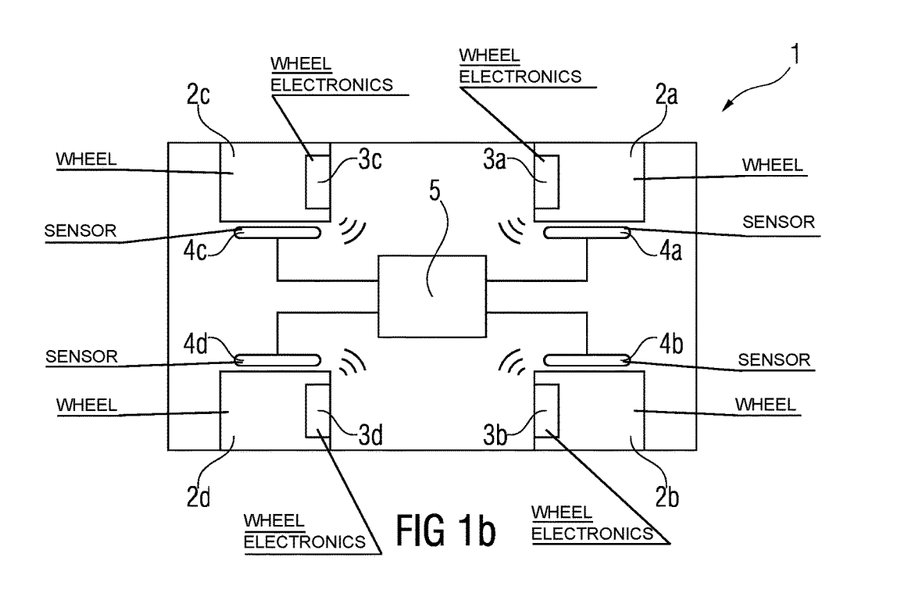
FIG. 1b shows a schematic representation of the vehicle from below in which essential elements of a tire pressure monitoring system are depicted.

FIG. 1a shows a side view of a vehicle 1. The two wheels 2b and 2d can be seen. The same vehicle is shown again from below in FIG. 1b, wherein essential elements of a tire pressure monitoring system are drawn. The four wheels 2a to 2d each have wheel electronics 3a to 3d. The wheels 2a to 2d are each assigned sensors 4a to 4d arranged on the vehicle. These sensors can for example be ABS sensors or ESP sensors. The sensors 4a to 4d are connected to an embodiment of a device 5 according to the invention. This device is, inter alia, set up to receive signals from the wheel electronics 3a to 3d.

Figure 2:
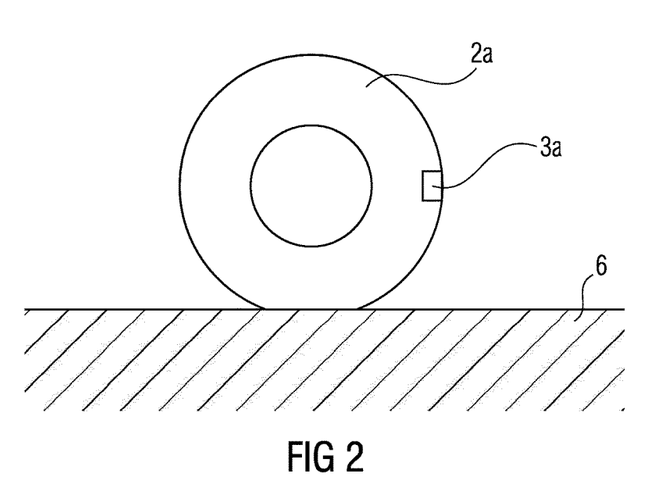
FIG. 2 shows a wheel equipped with wheel electronics.

FIG. 2 shows the wheel 2a once again in a side view, wherein it can be seen that the wheel electronics 3a rotate with the wheel when the wheel 2a rolls on the ground 6.

Figure 3:
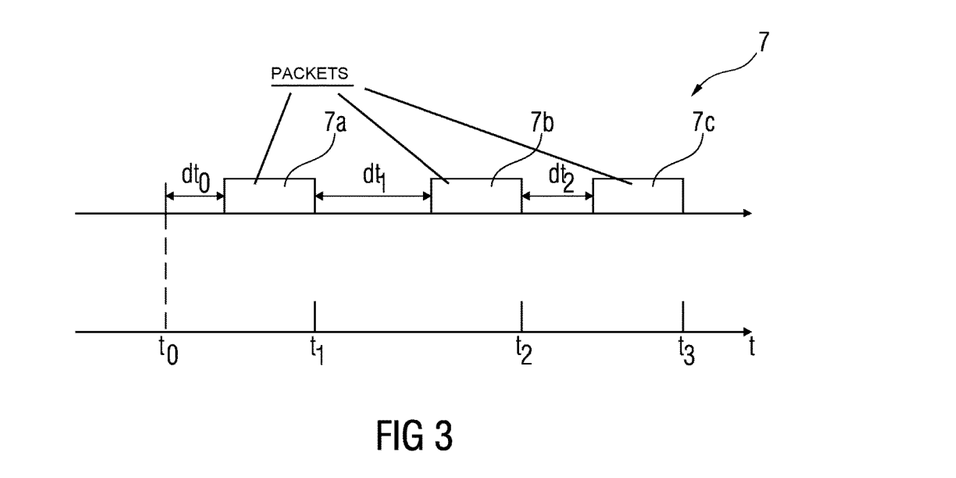
FIG. 3 shows a signal consisting of a plurality of packets.

The wheel unit 3a transmits a signal 7 which is shown in FIG. 3 and comprises the packets 7a, 7b and 7c. The wheel unit 3a transmits a plurality of packets because the reception unit arranged in the vehicle may not be able to receive one or more of the packets, for example due to shading from body parts. The time t is plotted on the bottom scale. At time $t_0$, the wheel passes through the first rotary angle position. This can for example be the highest position on the wheel (0°), or the middle of the tire footprint (180°), or the point of entrance or point of exit into or out of the tire footprint. After a delay $dt_0$, the first packet 7a is sent. The delay $dt_0$ can be determined beforehand or during operation by the wheel electronics. At time $t_1$, the packet 7a has been completely received by the vehicle. The interval between the first packet 7a and the second packet 7b is $dt_1$, and the interval between the second packet 7b and the third packet 7c is $dt_2$. The second packet 7b is completely received at time $t_2$, and the packet 7c is completely received at time $t_3$. The intervals between the packets $dt_1$ and $dt_2$ are measured continuously, and estimated values for these intervals are offered on their basis. The delay $dt_0$ with reference to the clock of the wheel electronics is well known. $dt_0$ can be adapted to any clock deviations from the relationship between the interval $dt_1$ estimated by the vehicle in comparison to an interval well known by the wheel unit between the first and second packet with reference to the wheel electronics clock. Given a knowledge of the delay $dt_0$ and the intervals $dt_1$ and $dt_2$ as well as the transmission durations for the packets 7a, 7b and 7c, the time at which the wheel assumed the first rotary angle position could be calculated retroactively for example from the receive time $t_3$ of the third packet to the time $t_0$. In order to infer $t_0$ from $t_2$, only the intervals $dt_0$ and $dt_1$ as well as the transmission durations of the packets 7a and 7b must be known. The invention is not restricted to a signal with three packets. Instead, any number of packets can be used as long as the number is at least two.

The problem of the imprecision of clocks of wheel electronics will be illustrated with reference to the interval $dt_1$.

Conventional clocks have an imprecision of about 2 to 5%. In the following example, an imprecision of 5% will be assumed. Let us assume that the interval $dt_1$ is 200 milliseconds, and the vehicle is moving at a speed of 150 km/h. A clock imprecision of 5% would then approximately correspond to an angle imprecision a of 75 degrees. This results from the following formula:

$$\alpha = \text{imprecision in }\% * dt_1 * \text{speed} * 360°$$

tire circumference, wherein 2 m was assumed for the tire circumference. The angle imprecision of 75° causes locating to generally take longer which, in certain circumstances, may not even converge. In U.S. Pat. No. 8,332,104 B2 for example, the intervals $dt_1$ and $dt_2$ are permanently programmed in the vehicle control unit. They are therefore not regularly determined to provide current estimated values for the time intervals; accordingly, the just-described angle imprecisions arise in U.S. Pat. No. 8,332,104 B2 which cause the method to converge only slowly.

Figure 4A:
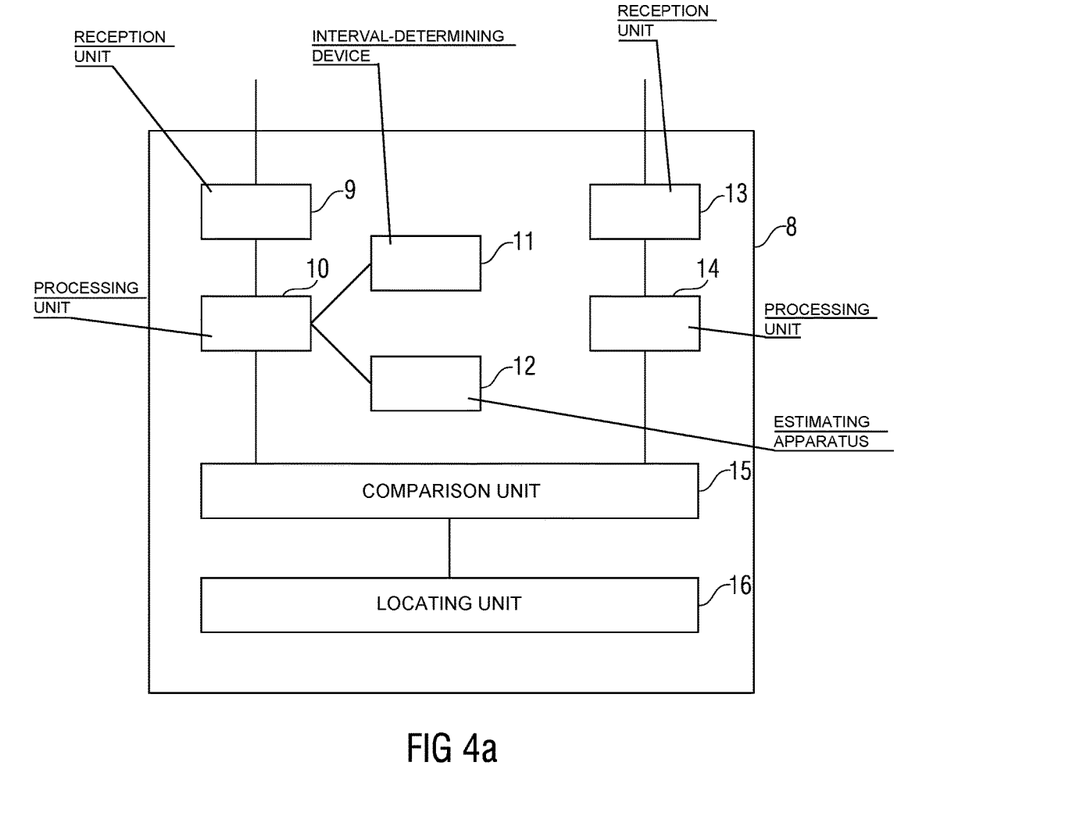
FIG. 4a shows an embodiment of a device according to the invention.

FIG. 4a shows an embodiment of a device for locating wheels of a vehicle in which at least one wheel has wheel electronics. The shown device 8 comprises a first reception unit 9 for receiving a signal from the wheel electronics that permits conclusions about a time $t_0$ at which the wheel assumed a first rotary angle position. The reception unit is set up to receive a signal consisting of a plurality of packets which are received at a delay. In addition, the device 8 has a first processing unit 10 to generate first rotary angle information based on the signal. This is set up to determine a time $t_0$ at which the wheel assumed the first rotary angle position based on one of the plurality of packets. For this purpose, the first processing unit 10 is connected to an interval-determining device 11 for determining at least one time interval between the packets, and an estimating apparatus 12 for providing at least one estimated value for the at least one time interval based on the determined at least one time interval.

Furthermore, the device 8 comprises a second reception unit 13 to receive rotary angle positions of the wheels measured by sensors which are each assigned to a specific position in the vehicle. These can be for example ABS sensors or ESP sensors. A second processing unit 14 provides second bits of rotary angle information based on the second rotary angle positions. This information can in particular be the times at which, from the perspective of the sensors, the assigned wheel assumed the second rotary angle position, which preferably corresponds to the first rotary angle position.

A comparison unit 15 uses the first rotary angle information of the first processing unit 10 and the second bits of rotary angle information of the second processing unit 14, and compares them with each other. Depending on the result from the comparison unit 15, the locating unit 16 locates the wheel assigned to the wheel electronics.

Figure 4B:
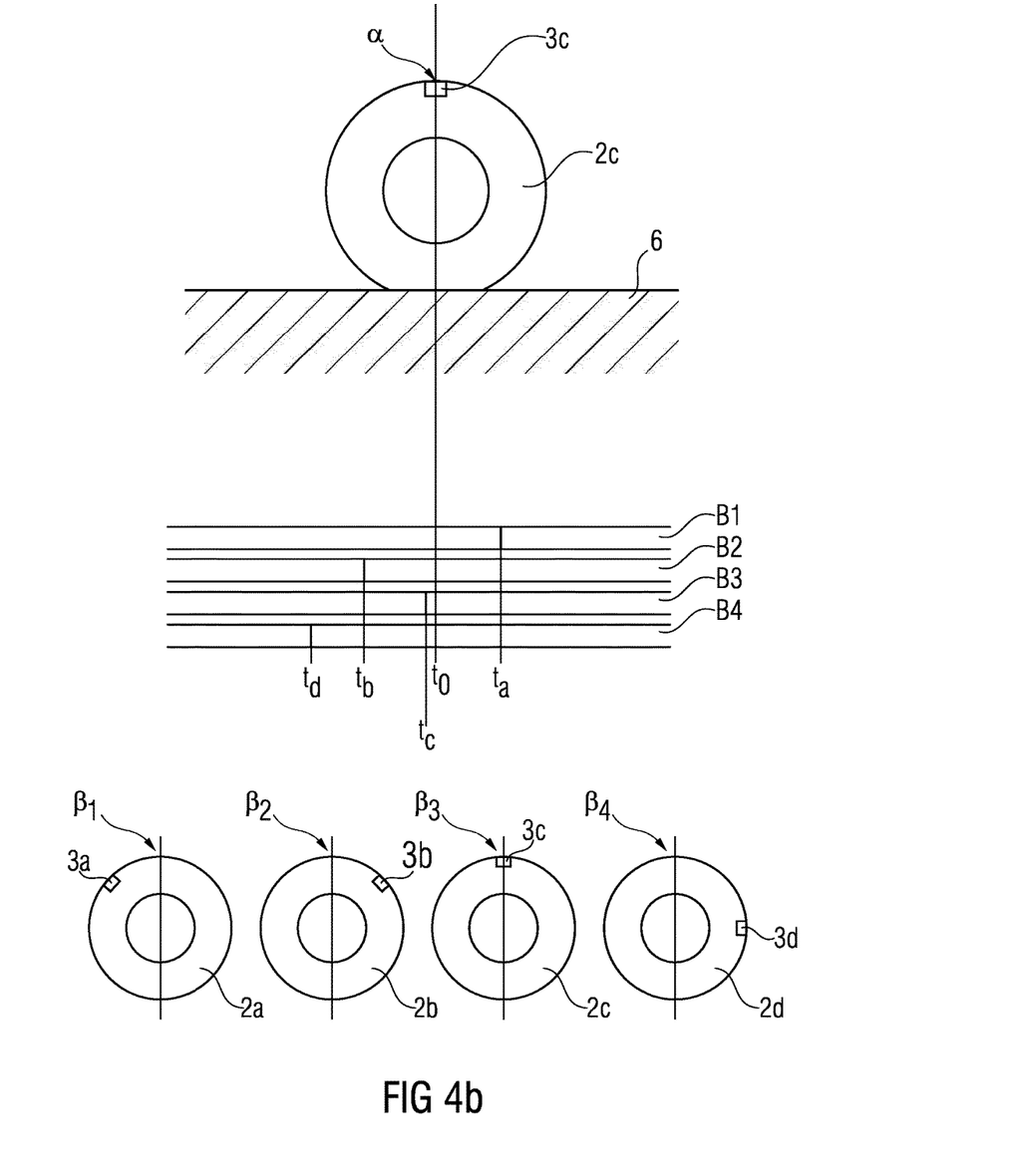
FIG. 4b shows a sketch to explain the comparison.

One embodiment of this comparison and locating will be explained further below with reference to FIG. 4b. At the top, the figure shows the wheel 2c with wheel electronics 3c which are currently in the first rotary angle position α. The first rotary angle information indicates when the wheel electronics 3c were in the first rotary angle position α. In the present example, the first rotary angle information accordingly corresponds to $t_0$. In the middle of FIG. 4b, time bars are plotted for each of the four wheels 2a-2d. The bar B1 indicates that the wheel 2a was in the second rotary angle position at time $t_a$. Accordingly, the bar B2 illustrates that the wheel 2b was in the second rotary angle position at time $t_b$. The bars B3 and B4 correspond to the wheels 2c and 2d. At time $t_b$, the wheel 2c assumed the second rotary angle position, whereas the wheel 2d was in this second rotary angle position at time $t_d$.

At the bottom in FIG. 4b, the wheels 2a-2d are depicted with their wheel electronics 3a-3d at time $t_0$. At time $t_0$, the wheel electronics 3a are still before the second rotary angle position $β_1$. Consequently, they pass through the second rotary angle position after $t_0$, as illustrated by the bar B1. The wheel electronics 3b have already passed through the second rotary angle position $β_2$. From the perspective of the sensor which is permanently assigned to the corresponding position in the vehicle, the wheel electronics 3c are almost exactly in the second rotary angle position $β_3$ at time $t_0$.

At time $t_0$, the wheel electronics $t_d$ have already passed through the second rotary angle position $β_4$ the longest.

As can be seen in FIG. 4b, the time $t_c$ is closest to the time $t_0$ so that, by means of a corresponding comparison, it can be concluded that the wheel electronics which transmitted the received signal are the wheel electronics 3c assigned to the wheel 2c. The deviations between $t_0$ and $t_c$ can result in particular from measuring imprecisions. Accordingly, the wheel can be correspondingly located by comparing the first rotary angle information $t_0$ with the second bits of rotary angle information $t_a$-$t_d$.

Figure 5:
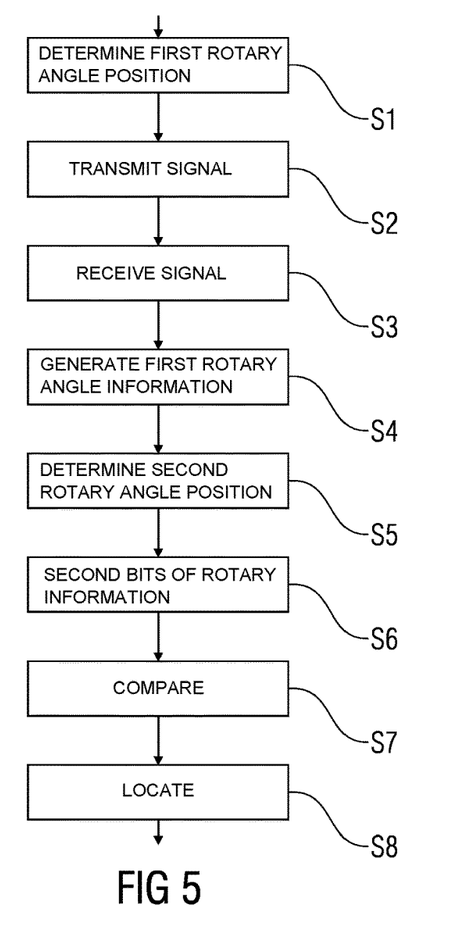
FIG. 5 shows method steps of an embodiment of a method according to the invention.

FIG. 5 shows steps of an embodiment of a method according to the invention. In step S1, first a first rotary angle position of a wheel is determined, to which the wheel electronics are assigned. In step S2, a signal is then transmitted by the wheel electronics to a vehicle receiver which permits conclusions to be made about a time at which the wheel assumed the first rotary angle position. This signal is received in step S3.

Based on the signal, first rotary angle information is generated in step S4. This step comprises determining the time at which the wheel assumed the first rotary angle position. One of the plurality of packets is used for this purpose. Second rotary angle positions of the wheels are determined in step S5 by sensors which are each assigned to a specific position in the vehicle. Based on these second bits of rotary angle positions, second bits of rotary angle information are provided (step S6). A comparison of the first rotary angle information with the second bits of rotary angle information then occurs in step S7 so that the wheel assigned to the wheel electronics can be located in step S8 depending on this comparison.

Figure 6:
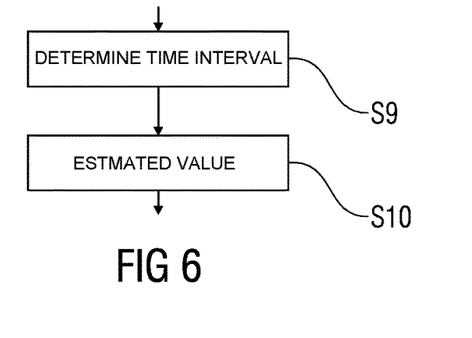
FIG. 6 shows additional steps of an embodiment of a method according to the invention.

FIG. 6 illustrates an embodiment of a routine which provides an estimated value for the method according to the invention. First, a time interval between the received packets is determined in step S9. In step S10, at least one estimated value is then provided for the at least one time interval based on the determined at least one time interval.

With the assistance of this estimated value, the cited time can be generated in the step of generating based on the at least one estimated value for the least one time interval and the number of a packet.

Figure 7:
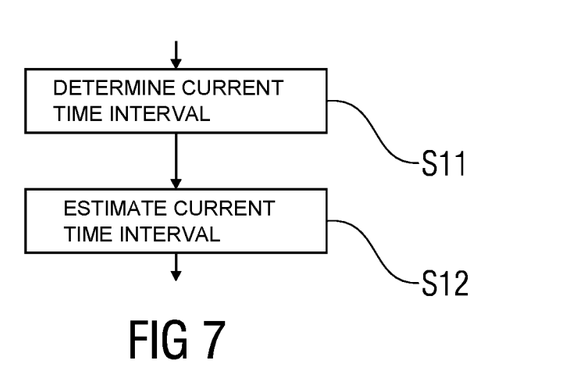
FIG. 7 shows additional steps of another embodiment of a method according to the invention.

FIG. 7 shows another embodiment of a routine which provides an estimated value for the method according to the invention. First, a current time interval $A_t$ is determined in step S11 during the current period t. On the basis of this current time interval $A_t$, the estimated value $S_t$ of the current period is determined in step S12 based on the following formula:

$$S_t A_t \cdot \gamma + S_{t-1} \cdot (1-\gamma)$$

wherein $A_t$, as already mentioned above, designates the current time interval in the current period, and $S_t$ designates the estimated value in the current period. $S_{t-1}$ is the estimated value of the preceding period. γ symbolizes a value between 0 and 1. The current time interval in the current period $A_t$, weighted as a correction factor for the estimated value of the preceding period $S_{t-1}$, is used in the estimated value of the current period $S_t$. Accordingly, only one estimated value, which is correspondingly updated, must be saved in each period.

By means of the method according to the invention, each of the packets can be used in order to draw conclusions about the time at which the wheel assumed the first rotary angle position. The time intervals can be determined repeatedly so that deviations between the clocks of the wheel units and their imprecisions are compensated.

In this manner, wheels of a vehicle can be located faster.

The explanations made with reference to the figures are purely illustrative and are not to be interpreted restrictively.

Numerous changes can be made to the described embodiments without departing from the scope of protection as defined in the accompanying claims.

LIST OF REFERENCE NUMBERS

1 Vehicle
2a to 2d Wheel
3a to 3d Wheel electronics
4a to 4d Sensor which is assigned to a specific position in the vehicle
5 Device for locating wheels of a vehicle
6 Ground
7 Signal
7a to 7c Packet
$t_0$ Time at which the wheel assumed the first rotary angle position
$t_1$ Receive time of the first packet
$t_2$ Receive time of the second packet
$t_3$ Receive time of the third packet
$dt_0$ Interval between $t_0$ and the beginning of sending the first packet
$dt_1$ Interval between the first and second packet
$dt_2$ Interval between the second and third packet
8 Embodiment of a device according to the invention
9 First reception unit
10 First processing unit
11 Interval-determining device
12 Estimating apparatus
13 Second reception unit
14 Second processing unit
15 Comparison unit
16 Locating unit
α First rotary angle position
$β_1$-$β_4$ Second rotary angle position
B1-B4 Bars for depicting the time at which the corresponding wheel assumed the second rotary angle position
$t_a$-$t_d$ Second bits of rotary angle information
S1 Determination of a first rotary angle position
S2 Transmission of a signal
S3 Reception of the signal
S4 Generation of first rotary angle information
S5 Determination of second rotary angle positions
S6 Provision of second bits of rotary angle information
S7 Comparison of the first rotary angle information with the second bits of rotary angle information
S8 Locating
S9 Determination of at least one time interval between the packets
S10 Provision of at least one estimated value for the at least one time interval
S11 Determination of at least one time interval between the packets
S12 Provision of at least one estimated value for the at least one time interval

The invention claimed is:

1. A method for locating wheels of a vehicle and at least one of the wheels has wheel electronics, which comprises the following steps of:
receiving a signal from the wheel electronics which permits conclusions about a time at which a wheel assumed a first rotary angle position, the signal containing a plurality of packets received with a delay;
generating first rotary angle information based on the signal by determining the time at which the wheel assumed the first rotary angle position based on one of the plurality of packets;
determining second rotary angle positions of the wheels by sensors, the sensors are each assigned to a specific position on the vehicle;
generating second bits of rotary angle information based on the second rotary angle positions;
comparing the first rotary angle information with the second bits of rotary angle information;
determining the wheel assigned to the wheel electronics depending on the comparing step;
determining, from the signal that has been received from the wheel electronics, at least one time interval between the plurality of packets in the signal that has been received from the wheel electronics; and
generating at least one estimated value for the at least one time interval based on the at least one time interval determined from the signal received from the wheel electronics, wherein the at least one estimated value for the at least one time interval is a time period.

2. The method according to claim 1, wherein the wheel electronics execute the following steps:
determining the first rotary angle position of the wheel assigned to the wheel electronics; and
transmitting the signal which permits conclusions about the time at which the wheel assumed the first rotary angle position.

3. The method according to claim 1, wherein each of the packets has a number which indicates a rank assumed by the packets within a sequence of the plurality of packets, and a step of determining the time based on the at least one estimated value for the at least one time interval and the number of a packet is performed if a received signal does not contain a first packet.

4. The method according to claim 1, wherein the step of determining at least one time interval between the packets is executed several times, and determined time intervals are saved.

5. The method according to claim 4, which further comprises executing the method in a plurality of sequential periods, and only time intervals of most recent n periods are saved.

6. The method according to claim 4, wherein the step of generating the at least one estimated value includes the further step of forming at least one average from saved time intervals.

7. The method according to claim 1, wherein the step of generating the at least one estimated value comprises the further steps of:
calculating a first product by multiplying the at least one time interval determined in a current period by a predetermined value which lies between 0 and 1;
calculating a second product by multiplying an estimated value of a preceding period by one minus the predetermined value, wherein the preceding period directly precedes the current period in time; and
calculating the estimated value of the current period by adding the first and second product.

8. The method according to claim 1, wherein the step of determining at least one time interval between the packets is only executed when a received signal contains all anticipated packets.

9. A device for locating wheels of a vehicle and at least one wheel has wheel electronics, the device comprising:

a first reception unit for receiving a signal from the wheel electronics which permits conclusions about a time at which the wheel assumed a first rotary angle position;

a first processing unit for generating first rotary angle information based on the signal;

sensors being each assigned to a specific position on the vehicle;

a second reception unit for receiving second rotary angle positions of the wheels measured by said sensors;

a second processing unit for providing second bits of rotary angle information based on the second rotary angle positions;

a comparison unit for comparing the first rotary angle information with the second bits of rotary angle information;

a locating unit for locating the wheel assigned to the wheel electronics depending on a result of said comparison unit;

said first reception unit being set up to receive the signal containing a plurality of packets which are received with a delay;

said first processing unit being set up to determine the time at which the wheel assumed the first rotary angle position based on one of the plurality of packets;

an interval-determining device configured for determining at least one time interval between the plurality of packets from the signal received from the wheel electronics; and an estimating apparatus for generating at least one estimated value for the at least one time interval based on the at least one time interval determined from the signal received from the wheel electronics, wherein the at least one estimated value for the at least one time interval is a time period.

10. A tire pressure monitoring system, comprising: a device according to claim 9.

* * * * *